US009102571B2

(12) United States Patent
Szweda et al.

(10) Patent No.: US 9,102,571 B2
(45) Date of Patent: Aug. 11, 2015

(54) METHODS OF FORMING CERAMIC MATRIX COMPOSITE STRUCTURES

(71) Applicant: COI Ceramics, Inc., San Diego, CA (US)

(72) Inventors: Andrew Szweda, San Diego, CA (US); Thomas Barrett Jackson, Portland, OR (US)

(73) Assignee: COI CERAMICS, INC., San Diego, CA (US)

( * ) Notice: Subject to any disclaimer, the term of this patent is extended or adjusted under 35 U.S.C. 154(b) by 0 days.

(21) Appl. No.: 13/741,052

(22) Filed: Jan. 14, 2013

(65) Prior Publication Data
US 2014/0200130 A1    Jul. 17, 2014

(51) Int. Cl.
C04B 35/64    (2006.01)
C04B 35/71    (2006.01)
(Continued)

(52) U.S. Cl.
CPC ............... *C04B 35/64* (2013.01); *C04B 35/117* (2013.01); *C04B 35/14* (2013.01); *C04B 35/563* (2013.01); *C04B 35/565* (2013.01); *C04B 35/5611* (2013.01); *C04B 35/5622* (2013.01); *C04B 35/571* (2013.01); *C04B 35/581* (2013.01); *C04B 35/583* (2013.01); *C04B 35/584* (2013.01); *C04B 35/5805* (2013.01); *C04B 35/589* (2013.01); *C04B 35/58071* (2013.01); *C04B 35/6269* (2013.01); *C04B 35/62873* (2013.01); *C04B 35/6303* (2013.01); *C04B 35/6316* (2013.01); *C04B 35/63416* (2013.01); *C04B 35/63488* (2013.01); *C04B 35/71* (2013.01); *C04B 35/803* (2013.01); *C04B 35/806* (2013.01); *C04B 2235/3218* (2013.01); *C04B 2235/3418* (2013.01);

(Continued)

(58) Field of Classification Search
CPC .......................................... C04B 35/71–35/806
See application file for complete search history.

(56) References Cited

U.S. PATENT DOCUMENTS

| 5,290,389 A | 3/1994 | Shupe et al. |
| 5,419,231 A * | 5/1995 | Earle et al. ............... 87/1 |

(Continued)

FOREIGN PATENT DOCUMENTS

| EP | 1004559 | 5/2000 |
| EP | 1880984 | 1/2008 |

OTHER PUBLICATIONS

International Search Report for International Application No. PCT/US2014/011218 dated Apr. 22, 2014, 7 pages.
(Continued)

*Primary Examiner* — Joseph S Del Sole
*Assistant Examiner* — Russell Kemmerle, III
(74) *Attorney, Agent, or Firm* — TraskBritt

(57) ABSTRACT

A method of forming a ceramic matrix composite structure. The method comprises forming at least one prepregged composite material comprising a ceramic fiber preform and a pre-ceramic matrix slurry. The at least one prepregged composite material is placed over at least one surface of a tool using an advanced fiber placement apparatus to form an at least partially uncured composite material structure. The at least partially uncured composite material structure is exposed at least to elevated temperatures to convert the at least partially uncured composite material structure into a ceramic matrix composite structure. A system for forming a ceramic matrix composite structure, an advanced fiber placement apparatus, and a ceramic matrix composite structure are also described.

28 Claims, 6 Drawing Sheets

(51) Int. Cl.

| | |
|---|---|
| C04B 35/117 | (2006.01) |
| C04B 35/14 | (2006.01) |
| C04B 35/56 | (2006.01) |
| C04B 35/563 | (2006.01) |
| C04B 35/565 | (2006.01) |
| C04B 35/571 | (2006.01) |
| C04B 35/58 | (2006.01) |
| C04B 35/581 | (2006.01) |
| C04B 35/583 | (2006.01) |
| C04B 35/584 | (2006.01) |
| C04B 35/589 | (2006.01) |
| C04B 35/626 | (2006.01) |
| C04B 35/628 | (2006.01) |
| C04B 35/63 | (2006.01) |
| C04B 35/634 | (2006.01) |
| C04B 35/80 | (2006.01) |

(52) U.S. Cl.
CPC .... *C04B 2235/483* (2013.01); *C04B 2235/524* (2013.01); *C04B 2235/5224* (2013.01); *C04B 2235/5228* (2013.01); *C04B 2235/5244* (2013.01); *C04B 2235/5248* (2013.01); *C04B 2235/5256* (2013.01); *C04B 2235/5268* (2013.01); *C04B 2235/5445* (2013.01); *C04B 2235/6026* (2013.01); *C04B 2235/6028* (2013.01); *C04B 2235/612* (2013.01); *C04B 2235/616* (2013.01)

(56) References Cited

U.S. PATENT DOCUMENTS

| | | | | |
|---|---|---|---|---|
| 5,512,359 | A * | 4/1996 | Leung et al. | 428/294.1 |
| 6,050,315 | A | 4/2000 | Deckers et al. | |
| 6,096,164 | A | 8/2000 | Benson et al. | |
| 6,290,799 | B1 | 9/2001 | Deckers et al. | |
| 6,350,713 | B1 | 2/2002 | Petrak | |
| 6,861,131 | B2 * | 3/2005 | Evans | 428/304.4 |
| 6,934,600 | B2 * | 8/2005 | Jang et al. | 700/182 |
| 2002/0176979 | A1 * | 11/2002 | Evans | 428/292.1 |
| 2002/0197465 | A1 | 12/2002 | Butner et al. | |
| 2003/0054150 | A1 * | 3/2003 | Evans | 428/297.4 |
| 2003/0236588 | A1 * | 12/2003 | Jang et al. | 700/119 |
| 2004/0018352 | A1 * | 1/2004 | Evans | 428/292.1 |
| 2005/0084665 | A1 * | 4/2005 | DiChiara, Jr. | 428/293.4 |
| 2009/0014926 | A1 * | 1/2009 | Marini | 264/635 |
| 2009/0211698 | A1 | 8/2009 | McCowin | |
| 2010/0003402 | A1 | 1/2010 | Stout et al. | |
| 2010/0081556 | A1 | 4/2010 | Heng et al. | |
| 2011/0071013 | A1 | 3/2011 | Newton et al. | |

OTHER PUBLICATIONS

International Written Opinion for International Application No. PCT/US2014/011218 dated Apr. 22, 2014, 10 pages.

* cited by examiner

METHODS OF FORMING CERAMIC MATRIX COMPOSITE STRUCTURES

FIELD

The disclosure, in various embodiments, relates generally to methods of forming ceramic matrix composite structures, and to related systems, apparatuses, and ceramic matrix composite structures. More specifically, the disclosure relates to methods of forming ceramic matrix composite structures using an advanced fiber placement apparatus, and to related systems, apparatuses, and ceramic matrix composite structures.

BACKGROUND

A ceramic matrix composite (CMC) is a material including reinforcing ceramic fibers embedded in a ceramic matrix. CMCs can exhibit a variety of desirable properties, such as high temperature stability, high thermal resistance, high mechanical integrity, high hardness, high corrosion resistance, light weight, nonmagnetic properties, and nonconductive properties. CMCs can thus be used to form a number of industrial and military structures including, for example, aerospace, marine, and automotive structures requiring one or more of the aforementioned properties.

One approach toward forming CMC structures includes the use of resin transfer molding (RTM). To form a CMC structure using RTM, ceramic fibers are placed into a mold in a desired arrangement. The mold is then evacuated, a resin is introduced into the mold under pressure, and the temperature of the mold is controlled to enable the resin to set. The resin is then cured and pyrolyzed at elevated temperatures to form the CMC structure. Unfortunately, however, RTM is generally limited to use in forming relatively small CMC structures (e.g., due to mold size limitations), and can result in ceramic matrix uniformity issues. For example, gas bubbles can be introduced into or evolve within the resin during processing that cannot escape or are difficult to remove during cure and pyrolysis. Consequently, the gas bubbles may be present in the ceramic matrix of the CMC structure, and can negatively affect the desired properties thereof.

Another approach toward forming CMC structures includes the use of chemical vapor infiltration (CVI). To form a CMC structure using CVI, dry ceramic fiber preforms, such as dry ceramic woven fabrics, are placed on a tool in a desired arrangement to form a dry ceramic fiber structure. A chemical vapor deposition (CVD) process is then used to infiltrate the dry ceramic fiber structure with a ceramic matrix and form the CMC structure. Unfortunately, however, CVI requires complex and costly tooling to ensure that the dry ceramic fiber structure is appropriately shaped, and to ensure the CMC structure includes a uniform ceramic matrix. In addition, the nature of the CVD process typically limits the reusability of the tooling, significantly adding to CMC structure fabrication costs.

Yet another approach toward forming CMC structures involves hand placement (e.g., lay up) of ceramic fiber preforms, such as ceramic tapes or ceramic woven fabrics, infiltrated with a pre-ceramic matrix slurry onto a tool to form an uncured composite material structure. The uncured composite material structure is then cured and either sintered or pyrolyzed to form a desired CMC structure. Unfortunately, however, such processing can be prohibitively expensive as hand placement can be time and labor intensive, as well as enhancing potential for product defects due to human error.

Yet still another approach toward forming CMC structures involves filament winding of ceramic fiber tows infiltrated with a pre-ceramic matrix slurry onto a tool to form an uncured composite material structure. The uncured composite material structure is then cured and either sintered or pyrolyzed to form a desired CMC structure. Unfortunately, however, filament winding is generally limited to forming CMC structures that are substantially cylindrical in shape. Namely, the tool upon which the tows are wound is generally limited to being substantially cylindrical in shape so that the tows follow a placement path permitting the tows to remain in place on the tool (i.e., a geodesic path).

It would, therefore, be desirable to have new methods, systems, and apparatuses for forming a CMC structure that are easy to employ, cost-effective, fast, and more versatile as compared to conventional methods, systems, and apparatuses for forming CMC structures. Such methods, systems, and apparatuses may, for example, facilitate increased adoption and use of CMC structures in industrial and military applications.

SUMMARY

Embodiments described herein include methods of forming ceramic matrix composite structures, and related systems, apparatuses, and ceramic matrix composite structures. For example, in accordance with one embodiment described herein, a method of forming a ceramic matrix composite structure comprises forming at least one prepregged composite material comprising a ceramic fiber preform and a pre-ceramic matrix slurry. The at least one prepregged composite material is placed over at least one surface of a tool using an advanced fiber placement apparatus to form an at least partially uncured composite material structure. The at least partially uncured composite material structure is exposed at least to elevated temperatures to convert the at least partially uncured composite material structure into a ceramic matrix composite structure.

In additional embodiments, a system for forming a ceramic matrix composite structure comprises an advanced fiber placement apparatus, a curing apparatus, and a densification apparatus. The advanced fiber placement apparatus is configured to place at least one prepregged composite material over at least one surface of a tool, the at least one (prepregged composite material comprising a ceramic fiber preform infiltrated with a pre-ceramic matrix slurry. The curing apparatus is configured to cure the at least partially uncured composite material structure to form a substantially cured composite material structure. The densification apparatus is configured to densify the substantially cured composite material structure to form a ceramic matrix composite structure.

In yet additional embodiments, an advanced fiber placement apparatus comprises at least one placement head configured to draw, align, place, cut, and rethread at least one prepregged composite material comprising a ceramic fiber preform infiltrated with a pre-ceramic matrix slurry, and at least one reel of the at least one prepregged composite material.

In yet still additional embodiments, a ceramic matrix composite structure comprises a structure formed by the method comprising forming at least one prepregged composite material comprising a ceramic fiber preform and a pre-ceramic matrix slurry, placing the at least one prepregged composite material over at least one surface of a tool using an advanced fiber placement apparatus to form an at least partially uncured composite material structure, and exposing the at least partially uncured composite material structure at least to elevated temperatures to convert the at least partially uncured composite material structure into a ceramic matrix composite structure.

DETAILED DESCRIPTION

Figure 1:
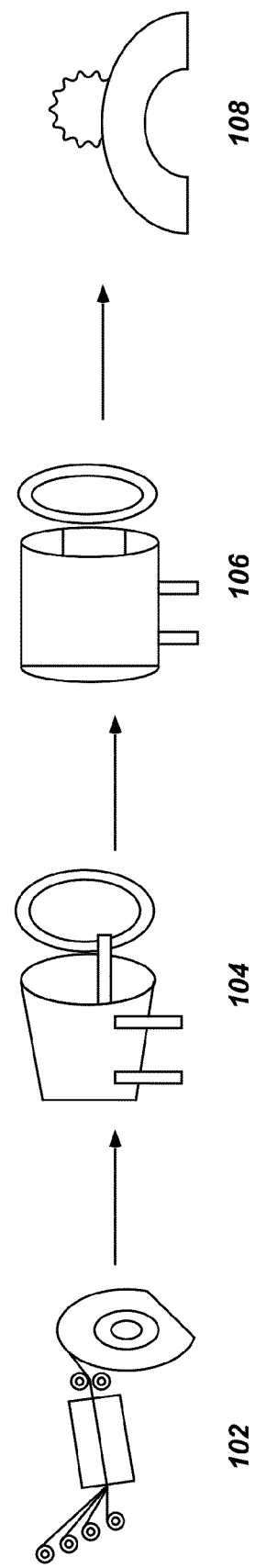
FIG. 1 is a simplified flow diagram of a method of forming a CMC structure, in accordance with embodiments of the disclosure.

Methods of forming a CMC structure are described, as are related systems, apparatuses, and CMC structures. In some embodiments, a method of forming a CMC structure includes placing (e.g., "laying up") a prepregged composite material on or over at least one surface of a tool using an advanced fiber placement (AFP) apparatus (which may also be referred to as an "automated" fiber placed apparatus) to form an at least partially uncured composite material structure. The at least partially uncured composite material structure may then be cured and either sintered or pyrolyzed to form the CMC structure. The CMC structure may exhibit properties desirable for use in a wide variety of industrial and military applications. The methods, systems, and apparatuses of embodiments of the disclosure may be faster, more cost-efficient, and more versatile than conventional methods, systems, and apparatuses used to form CMC structures.

The following description provides specific details, such as material types and processing conditions in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. Additional acts to form a CMC structure of the disclosure may be performed by conventional techniques, which are not described in detail herein. Also, the drawings accompanying the application are for illustrative purposes only, and are thus not drawn to scale. In addition, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature or method act indicates that such is contemplated for use in implementation of an embodiment of the disclosure and such term is used in preference to the more restrictive term "is" on as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "over," "top," "bottom," "underlying," etc., are used for clarity and convenience in understanding the disclosure and accompanying drawings and does not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

FIG. 1 is a simplified flow diagram illustrating a method of forming a CMC structure in accordance with embodiments of the disclosure. The method may include a lay up process 102 including placing at least one prepregged composite material on or over a surface of a tool using an AFP apparatus, a curing process 104 including curing the prepregged composite material after placement on or over the surface of the tool to form a cured composite material structure, a densification process 106 including sintering or pyrolyzing the cured composite material structure to form the CMC structure, and, optionally, a finalization process 108 including further treating (e.g., machining, coating, etc.) the CMC structure. With the description as provided below, it will be readily apparent to one of ordinary skill in the art that the method described herein may be used in various applications. In other words, the method may be used whenever it is desired to form a CMC structure.

Figure 2:
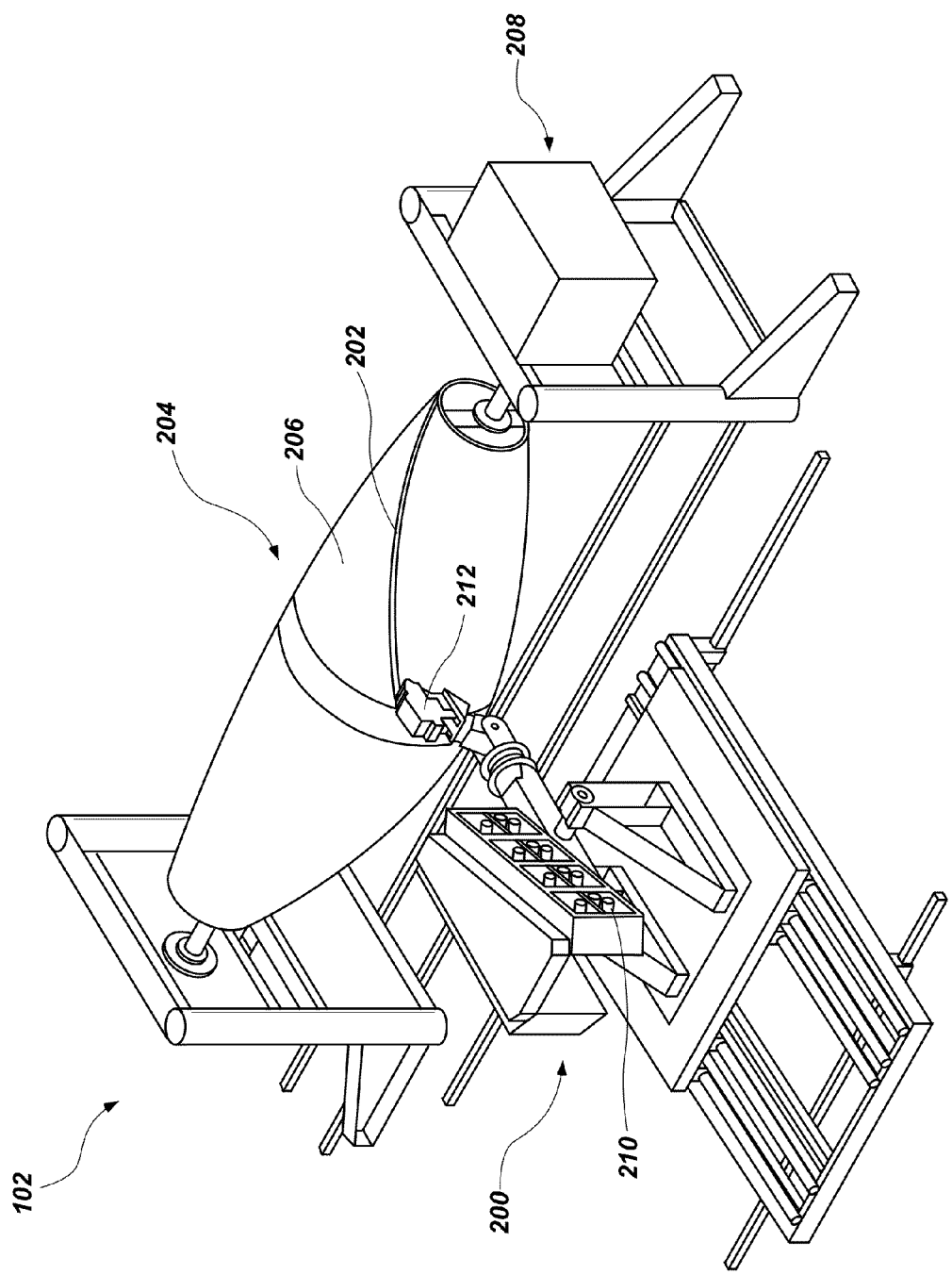
FIG. 2 is a simplified perspective view of a lay up process for the method illustrated in FIG. 1, in accordance with embodiments of the disclosure.

One embodiment of the disclosure will now be described with reference to FIG. 2, which illustrates a simplified perspective view of the lay up process 102. As shown in FIG. 2, the lay up process 102 includes placing at least one prepregged composite material 202 on or over at least one surface 206 of a tool 204 using an AFP apparatus 200. The prepregged composite material 202 includes a ceramic fiber preform infiltrated (e.g., impregnated) with a pre-ceramic matrix slurry. As used herein, the term "ceramic fiber preform" means and includes a structure formed of and including ceramic fibers. The ceramic fibers may be continuous, and may be oriented in a direction generally parallel to, generally perpendicular to, or at another angle with respect to a length of the ceramic fiber preform. The ceramic fiber preform may comprise a single tow of the ceramic fibers (e.g., a substantially unidirectional bundle of the ceramic fibers), may comprise a tape of multiple tows of the ceramic fibers (e.g., an array of substantially unidirectional tows of the ceramic fibers stitched together using another material, such as a glass material), or may comprise a woven fabric of multiple tows of the ceramic fibers (e.g., a plain weave of the multiple tows, a 4 harness satin weave of the multiple tows, a 5 harness satin weave of the multiple tows, an 8 harness satin weave of the multiple tows, etc.). The ceramic fiber preform may have any dimensions (e.g., length, width, thickness) compatible with the AFP apparatus 200 employed to apply the prepregged composite matrix material 202 to tool 204. For example, the ceramic fiber preform may have a length enabling a desired amount of the prepregged composite material 202 to be placed on or over the surface 206 of the tool 204, and may have a width compatible with a placement means (e.g., a placement head) of the AFP apparatus 200, such as a width within a range of from about one-eighth inch to about one inch. In some embodiments, the width of the ceramic fiber preform is about one inch.

The ceramic fibers of the ceramic fiber preform may be formed of and include a ceramic material compatible with the other components (e.g., the pre-ceramic matrix slurry) of the prepregged composite material 202, of appropriate physical characteristics for reinforcing the CMC structure to be formed, and formulated to withstand the processing conditions (e.g., temperatures, pressures, ambient atmosphere, etc.) used to form the CMC structure. As used herein, the term "compatible" means and includes a material that does not react with, break down, or absorb another material in an unintended way, and that also does not impair the chemical and/or mechanical properties of the another material in an unintended way. The ceramic fibers may be oxide ceramic fibers, or may be non-oxide ceramic fibers. The ceramic fiber preform may thus be an oxide-based ceramic fiber preform, or may be a non-oxide-based ceramic fiber preform. Non-limiting examples of suitable oxide ceramic fibers include alumina fibers, alumina-silica fibers, and alumina-boria-silica fibers. Such oxide ceramic fibers are commercially available from numerous sources including, but not limited to, 3M Company (St. Paul, Minn.) (e.g., under the NEXTEL® 312, NEXTEL® 440, NEXTEL® 550, NEXTEL® 610, and NEXTEL® 720 tradenames). Non-limiting examples of suitable non-oxide ceramic fibers include silicon carbide fibers, silicon nitride fibers, fibers including silicon carbide on a carbon core, silicon carbide fibers containing titanium, silicon oxycarbide fibers, silicon oxycarbonitride fibers, and carbon fibers. Such non-oxide ceramic fibers are commercially available from numerous sources including, but not limited to, COI Ceramics, Inc. (San Diego, Calif.) (e.g., under the SYLRAMIC® tradename), Nippon Carbon Co., Ltd. (Tokyo, JP) (e.g., under the CG NICALCON™, HI-NICALCON™, and NICALCON TYPE S™ tradenames), and Ube Industries (Tokyo, JP) (e.g., under the TYRANNO SA, and TYRANNO LoxM tradenames). In some embodiments, the ceramic fibers of the ceramic fiber preform are NEXTEL® 610 fibers, The ceramic fiber preform including the ceramic fibers may be formed using conventional processes and equipment, which are not described in detail herein.

The pre-ceramic matrix slurry may be a slurry suitable for forming a ceramic matrix over and around the ceramic fiber preform, and including sufficient chemical and mechanical properties (e.g., rigidity, tackiness, environmental resistance, etc.) to facilitate placement of the prepregged composite material 202 on or over the surface 206 of the tool 204 using the AFP apparatus 200, as described in further detail below. For example, the pre-ceramic matrix slurry may be a slurry formulated to enable forming an oxide ceramic matrix or a non-oxide ceramic matrix upon further processing (e.g., sintering, pyrolysis, etc.), to enable the prepregged composite material 202 to be cut by the AFP apparatus 200 and to adhere at least to the surface 206 of the tool 204 and to the prepregged composite material 202 itself during placement, and to withstand and accommodate without substantial degradation the physical and environmental processing conditions associated with the placement of the prepregged composite material 202 for as long as is needed to complete such placement.

As a non-limiting example, the pre-ceramic matrix slurry may be an oxide-based pre-ceramic matrix slurry including an oxide ceramic sot and an oxide ceramic filler. The oxide ceramic sol may be an alumina sot (e.g., colloidal alumina in water), a silica sot (e.g., colloidal silica in water), an alumina-silica sol (e.g., colloidal alumina-silica in water), or a combination thereof. In some embodiments, the oxide ceramic sol is a silica sol. Solids (e.g., silica) may constitute from about 15 percent to about 60 percent of the total weight of the oxide ceramic sol. In turn, the oxide ceramic filler may include particles of at least one oxide ceramic material, such as particles of at least one of alumina, silica, zirconia. In some embodiments, the oxide ceramic filler includes particles of alumina. Each of the particles may be of a desired size (e.g., within a range of from about 20 nanometers to about 1000 nanometers) and shape (e.g., a spherical shape, a hexahedral shape, an ellipsoidal shape, a cylindrical shape, an irregular shape, etc.). In addition, the particles may be monodisperse, wherein each of the particles has substantially the same size and shape, or may be polydisperse, wherein the particles include a variety of sizes and/or shapes.

The ratio of the oxide ceramic sol to the oxide ceramic filler in the oxide-based pre-ceramic matrix slurry may depend on the properties (e.g., thermal stability, viscosity, weight, conductivity, etc.) of the materials selected for the oxide ceramic sol and the oxide ceramic filler, on the processing conditions used to form the CMC structure from the prepregged composite material 202, and on the desired properties (e.g., thermal stability, thermal-shock resistance, mechanical stability, hardness, corrosion resistance, weight, conductivity, etc.) of the CMC structure to be formed. The oxide-based pre-ceramic matrix slurry may, for example, include from about 20 percent by weight to about 60 percent by weight of the oxide ceramic sot, such as from about 25 percent by weight to about 40 percent by weight, and may include from about 20 percent by weight to about 80 percent by weight of the oxide ceramic filler, such as from about 40 percent by weight to about 70 percent by weight. In some embodiments, the oxide-based pre-ceramic matrix slurry includes about 28 percent by weight silica sol, and about 60 percent by weight alumina filler.

Optionally, the oxide-based pre-ceramic matrix may also include at least one processing aid. The processing aid may comprise a material that, when combined with the processing conditions (e.g., temperatures, pressures, ambient environment, etc.) applied before, during, and after placement of the prepregged composite material 202, enhances one or more properties of the prepregged composite material 202. The processing aid may, for example, comprise a material that enhances at least one of the rigidity, tackiness, and environmental resistance properties (e.g., maximum possible exposure time to processing conditions) of the prepregged composite material 202 before and during placement of the prepregged composite material 202 on the surface 206 of the tool 204. For example, the processing aid may comprise a water-soluble organic material including, but not limited to, a polyol (e.g., glycerol), a cellulose gum (e.g., methyl cellulose), a vinyl alcohol (e.g., polyvinyl alcohol), a glycol propylene glycol, ethylene glycol), and acacia gum. In some embodiments, the at least one processing aid includes propylene glycol and polyvinyl alcohol. If included, the processing aid may constitute from about 0.1 percent to about 20 percent of the total weight of the oxide-based pre-ceramic matrix, such as from about 5 percent to about 15 percent of the total weight of the oxide-based pre-ceramic matrix. In some embodiments, the oxide-based pre-ceramic matrix includes about 10.5 percent by weight propylene glycol, and about 1.5 percent by weight polyvinyl alcohol.

As another non-limiting example, the pre-ceramic matrix slurry may be a non-oxide-based pre-ceramic matrix slurry including a non-oxide pre-ceramic polymer, and a non-oxide ceramic filler. The non-oxide pre-ceramic polymer may be an organosilicon polymer formulated to form anon-oxide ceramic matrix upon further processing (e.g., curing and pyrolysis), and having sufficient chemical and mechanical properties to facilitate placement of the prepregged composite material 202. For example, the non-oxide pre-ceramic polymer may comprise at least one of a polysiloxane, a polysilazane (e.g., at least one of a hydridopolysilazane, a silacyclobutasilazane, a boron modified hydridopolysilazane, and a vinyl-modified hydridopolysilazane), a polysilane, a polycarbosilane, a polycarbosilazane, and a polysilsesequioxane, that enables the prepregged composite material 202 to be cut by the AFP apparatus 200 and to be placed on or over the surface 206 of the tool 204 using the AFP apparatus 200. Suitable non-oxide pre-ceramic polymers are commercially available from numerous sources including, but not limited to, Starfire Systems (Schenectady, N.Y.) (e.g., under the SMP-500, and SMP-800 tradenames). In some embodiments, the non-oxide pre-ceramic polymer is SMP-500. In turn, the non-oxide ceramic filler may include particles of at least one non-oxide ceramic material, such as particles of at least one of silicon carbide, silicon nitride, silicon hexaboride, aluminum nitride, boron nitride, boron carbide, titanium boride, titanium carbide, and hafnium carbide. In some embodiments, the non-oxide ceramic filler material includes particles of silicon carbide. Each of the particles may be of a desired size (e.g., within a range of from about 20 nanometers to about 1000 nanometers) and shape (e.g., a spherical shape, a hexahedral shape, an ellipsoidal shape, a cylindrical shape, an irregular shape, etc.). In addition, the particles may be monodisperse, wherein each of the particles has substantially the same size and shape, or may be polydisperse, wherein the particles include a variety of sizes and/or shapes.

The ratio of the non-oxide pre-ceramic polymer to the non-oxide ceramic filler in the non-oxide-based pre-ceramic matrix slurry may be related to the properties (e.g., thermal stability, viscosity, weight, conductivity, etc.) of the materials selected for the non-oxide pre-ceramic polymer and the non-oxide ceramic filler, on the processing conditions used to form the CMC structure from the prepregged composite material 202, and on the desired properties (e.g., thermal stability, thermal-shock resistance, mechanical stability, hardness, corrosion resistance, weight, conductivity, etc.) of the CMC structure to be formed. The non-oxide-based pre-ceramic matrix slurry may, fir example, include from about 20 percent by weight to about 60 percent by weight of the non-oxide pre-ceramic polymer, such as from about 30 percent by weight to about 50 percent by weight, and niay include from about 20 percent by weight to about 60 percent by weight of the non-oxide ceramic filler, such as from about 30 percent by weight to about 50 percent by weight.

Optionally, the non-oxide pre-ceramic matrix may also include one or more of at least one curing catalyst, and at least one compatible solvent (e.g., tetrahydrofuran, hexane, heptane, benzene, toluene, xylene, etc.). As used herein, the term "curing catalyst" refers to a material capable of substantially catalyzing the deep section infusibilization (e.g., cure) of the non-oxide pre-ceramic polymer in the prepregged composite material 202. Suitable curing catalysts are commercially available from numerous sources including, but not limited to, Sigma-Aldrich (St. Louis, Mo.) (e.g., under the LUPEROX® 101 tradename). If included, the curing catalyst may constitute from about 0.1 percent to about 2 percent of the total weight of the oxide-based pre-ceramic matrix, such as from about 0.1 percent to about 1.5 percent of the total weight of the oxide-based pre-ceramic matrix.

The prepregged composite material 202 including the ceramic fiber preform and the pre-ceramic matrix slurry may be formed using conventional processes and equipment, which are not described in detail herein. By way of non-limiting example, the pre-ceramic matrix slurry may be formed over and around the ceramic fibers of the ceramic fiber preform using at least one of a conventional spray-coating process, a conventional immersion-coating process, and a conventional soaking process. Regardless of the process utilized to form the prepregged composite material 202, the process may be controlled to facilitate a uniform and complete infiltration of the pre-ceramic matrix slurry over and around the ceramic fiber preform.

In some embodiments, such as where it is desired to form a CMC structure including an non-oxide ceramic matrix over and around the ceramic fiber preform, at least one interfacial material may be formed on the ceramic fiber preform prior to forming the pre-ceramic matrix slurry over and around the ceramic fiber preform. The interfacial material may, for example, be a material facilitating or enhancing interfacial bonding between the ceramic fiber preform and the pre-ceramic matrix slurry. By way of non-limiting example, the interfacial material may be at least one of boron nitride, silicon nitride, silicon carbide, aluminum nitride, boron carbide, and carbon. The interfacial material may be formed on or over the ceramic fiber preform using conventional processes (e.g., chemical vapor deposition, coating with polymer precursors followed by pyrolysis, etc.) and equipment, which are not described in detail herein.

With continued reference to FIG. 2, the tool 204 may be a structure exhibiting a desired configuration (e.g., size, and shape), that is chemically and mechanically compatible with the (prepregged composite material 202, and that is capable of withstanding the processing conditions (e.g., temperatures, pressures, ambient environment, etc.) used to place the prepregged composite material 202 on or over the surface 206 thereof using the AFP apparatus 200. The tool 204 may, for example, have a three-dimensional shape, such as a conical shape, a pyramidal shape, a cubic shape, a cuboidal shape, a spherical shape, a hemispherical shape, a cylindrical shape, a semicylindrical shape, truncated versions thereof or an irregular shape. Irregular three-dimensional shapes include complex shapes, such as shapes associated with aerospace, marine, and automotive structures and devices (e.g., hot exhaust structures, such as exhaust ducts, nozzles, fan cowls, and thrust reversers; auxiliary power units; fuselages; tapered wing skins; nose cones; etc.). The surface 206 of the tool 204 may thus be planar or non-planar (e.g., contoured, such as at least partially concave, at least partially convex, or a combination thereof). The tool 204 may be formed using conventional processes and equipment, which are not described in detail herein.

The tool 204 may be stationary, or may be mobile. For example, as depicted in FIG. 2, the tool 204 may be removably attached to a rotation device 208 configured for rotating the tool 204 during placement of the prepregged composite material 202 thereon or thereover. If performed, rotation of the tool 204 may be controlled (e.g., by way of computer numerical control) relative to the AFP apparatus 200 so that the prepregged composite material 202 is placed on or over the surface 206 of the tool 204 in a desired configuration (e.g., pattern).

The AFP apparatus 200 may be any AFP apparatus configured and operated to place the prepregged composite material 202 on or over the surface 206 of the tool 204. For example, the AFP apparatus 200 may be a conventional multi-axis AFP apparatus configured and operated to draw, align, place, cut, and rethread the prepregged composite material 202. As shown in FIG. 2, the AFP apparatus 200 may, for example, include a placement head 212 configured and operated to draw the at least one prepregged composite material 202 (e.g., in the form of one or more ceramic tow(s), ceramic tape(s), or ceramic woven fabric(s) infiltrated with the pre-ceramic matrix slurry) from at least one reel 210, to align and place at least a portion the prepregged composite material 202 on or over the surface 206 of the tool 204, to cut the prepregged composite material 202 following placement, and to rethread the prepregged composite material 202 for additional placement as desired. The AFP apparatus 200 may also be configured and operated to manipulate one or more physical properties (e.g., tackiness, rigidity, etc.) of the prepregged composite material 202 before and/or during placement on or over the surface 206 of the tool 204. For example, the AFP apparatus 200 may be configured and operated to cool the prepregged composite material 202 (e.g., to increase the rigidity thereof) to a temperature within a range of from about −25° C. to about 35° C. prior to placement on or over the surface 206 of the tool 204, and/or to heat the prepregged composite material 202 (e.g., to increase the tackiness thereof) to a temperature within a range of from about 85° C. to about 165° C. during placement on or over the surface 206 of the tool 204. Manipulation of the physical properties of the prepregged composite material 202 may occur in a single portion of the AFP apparatus 200 (e.g., within the placement head 212), or may occur in multiple portions of the AFP apparatus 200 (e.g., within an enclosure containing the at least one reel 210, and within the placement head 212). Operations performed by the AFP apparatus 200 may be substantially automatic (e.g., through use of computer numerical control). Non-limiting examples of AFP apparatuses suitable for use as the AFP apparatus 200 are described in U.S. Pat. Nos. 5290.389, 6,050,315, and 6,096,164, the entire disclosure of each of which is incorporated in its entirety herein by reference.

The AFP apparatus 200 may place multiple prepregged composite materials 202 (e.g., multiple ceramic tows, ceramic tapes, and/or ceramic woven fabrics infiltrated with the pre-ceramic matrix slurry) in continuous, edge to edge, contact, on the surface 206 of the tool 204. The multiple prepregged composite materials 202 may be placed simultaneously, sequentially, or a combination thereof. In addition, the AFP apparatus 200 may place additional prepregged composite materials 202 (e.g., additional ceramic tows, ceramic tapes, and/or ceramic woven fabrics infiltrated with the pre-ceramic matrix slurry) on or over the multiple prepregged composite materials 202 previously placed using the AFP apparatus 200. Accordingly, the AFP apparatus 200 may place the prepregged composite materials 202 on the surface 206 of the tool 204 to any desired amount of coverage and to any desired thickness. The multiple prepregged composite materials 202 may form an at least partially uncured composite material structure (not shown) on or over the surface 206 of the tool 204. In addition, if multiple layers (e.g., plies) of the prepregged composite materials 202 are placed over the surface 206 of the tool 204, each layer of the prepregged composite materials 202 may extend in substantially the same direction (e.g., each ceramic tow, ceramic tape, and/or ceramic woven fabric infiltrated with the pre-ceramic matrix slurry may be oriented parallel to each other ceramic tow, ceramic tape, and/or ceramic woven fabric infiltrated with the pre-ceramic matrix slurry), or at least one layer of the prepregged composite material 202 may extend in a direction different than at least one other layer of the prepregged composite material 202 (e.g., ceramic tows, ceramic tapes, and/or ceramic woven fabrics infiltrated with the pre-ceramic matrix slurry in one layer may be oriented in a different direction than other ceramic tows, ceramic tapes, and/or ceramic woven fabrics infiltrated with the pre-ceramic matrix in another layer).

The lay up process 102 (FIG. 1) has the advantage of being able to utilize AR apparatuses that have been utilized in conventional polymer matrix composite (PMC) manufacturing. While such AFP apparatuses have been successfully used to fabricate PMC structures, previous utilizations of such AFP apparatuses did not recognize or appreciate the potential for use thereof to form CMC structures.

Following the lay up process 102, the at least partially uncured composite material structure may be subjected at least to the curing process 104 (FIG. 1) and the densification process 106 (FIG. 1) to form a CMC structure exhibiting a desired configuration. The curing process 104 may include subjecting the at least partially uncured composite material structure to at least one of elevated temperature(s) and elevated pressure(s) (e.g., using a curing apparatus, such as a autoclave, a compression mold, or a lamination press) for a sufficient period of time to form a substantially cured composite material structure (not shown) having sufficient mechanical integrity to be handled. As a non-limiting example, if the at least partially uncured composite material structure is substantially uncured, the curing process 104 may include placing the tool 204 including the at least partially uncured composite material structure formed thereon or thereover into a vacuum bag, and exposing the at least partially uncured composite material structure to at least one temperature less than or equal to about 175° C. and at least one pressure less than or equal to about 100 pounds per square inch (psi) for a sufficient period of time to form the substantially cured composite material structure. The substantially cured composite material structure may then be removed from the tool 204 and subjected to further processing to form the CMC structure, as described in more detail below. Alternatively, if the at least partially uncured composite material structure exhibits sufficient mechanical integrity, the curing process 104 may include removing the at least partially uncured composite material structure from the tool 204, placing the at least partially uncured composite material structure on another tool (not shown) configured to hold the at least partially uncured composite material, vacuum bagging the at least partially uncured composite material structure and the another tool, and exposing the at least partially uncured composite material structure to the aforementioned temperature and pressure for a sufficient period of time to form the substantially cured composite material structure.

The densification process 106 may include sintering or pyrolyzing the substantially cured composite material structure at elevated temperature(s) (e.g., using a densification apparatus, such as a high-temperature furnace) to form a CMC structure (not shown). For example, if the substantially cured composite material structure includes an oxide pre-ceramic matrix, the substantially cured composite material structure may be sintered at a temperature within a range of from about 1000° C. to about 1350° C. for a sufficient amount of time to form an oxide CMC structure exhibiting a desired amount of porosity, such as from about 10 percent porosity to about 25 percent porosity. As another example, if the substantially cured composite material structure includes a non-oxide pre-ceramic matrix, the substantially cured composite material structure may be pyrolyzed at a temperature within a range of from about 600° C. to about 1400° C. in an inert ambient atmosphere (e.g., a nitrogen atmosphere, an argon atmosphere, etc.) to convert at least 70 percent of the pre-ceramic polymer of the non-oxide pre-ceramic matrix to a non-oxide ceramic material and form a non-oxide CMC structure. If the pyrolysis process converts less than all of the pre-ceramic polymer to the non-oxide ceramic material, the non-oxide CMC structure may be infiltrated with additional pre-ceramic polymer using conventional processes, and may then be subjected to at least one additional pyrolysis process until the non-oxide CMC structure exhibits a non-oxide ceramic matrix formed of and including a desired amount of the non-oxide ceramic material, such as a non-oxide ceramic matrix formed of and including greater than or equal to about 95 percent of the non-oxide ceramic material.

As previously discussed with respect to FIG. 1, following the densification process 106, the CMC structure may, optionally, be subjected to at least one finalization process 108. The finalization process 108 may, for example, include one or more of machining (e.g., trimming, planarizing, etc.), and seal coating (e.g., if the CMC structure is a non-oxide CMC structure) the CMC structure. Alternatively, the finalization process 108 may be omitted, and the CMC structure may be used as is.

Using the methods, systems, and apparatuses of the disclosure, the formation of CMC structures of a wide variety of shapes and sizes (e.g., including large, complex shapes associated with military and industrial applications) can be achieved quickly and in a cost-effective manner. Accordingly, the methods, systems, and apparatuses of the disclosure may improve the affordability of CMC structures, facilitating increased production of aerospace, marine, and automotive structures exhibiting improved properties (e.g., temperature stability, thermal resistance, hardness, corrosion resistance, weight, nonmagnetic properties, nonconductive properties, etc.) as compared to corresponding aerospace, marine, and automotive structures formed of non-CMC materials.

The following example serves to explain some embodiments of the disclosure in more detail. The example is not to be construed as being exhaustive or exclusive as to the scope of the disclosure.

EXAMPLE

A pre-ceramic matrix slurry including a silica sol, an alumina filler, a propylene glycol processing aid, and a polyvinyl alcohol processing aid was prepared using a conventional ball milling process. The silica sol included colloidal silica dispersed in water. The colloidal silica particles constituted about 40 percent of the total weight of the silica sol, and the silica sol constituted about 28.11 percent of the total weight of the pre-ceramic matrix slurry. The alumina filler constituted about 59.90 percent of the total weight of the pre-ceramic matrix slurry, and included alumina particles having an average diameter of about 300 nanometers. The propylene glycol processing aid constituted about 10.62 percent of the total weight of the pre-ceramic matrix slurry. The polyvinyl alcohol processing aid constituted about 1.37 percent of the total weight of the pre-ceramic matrix slurry.

Figure 3A:
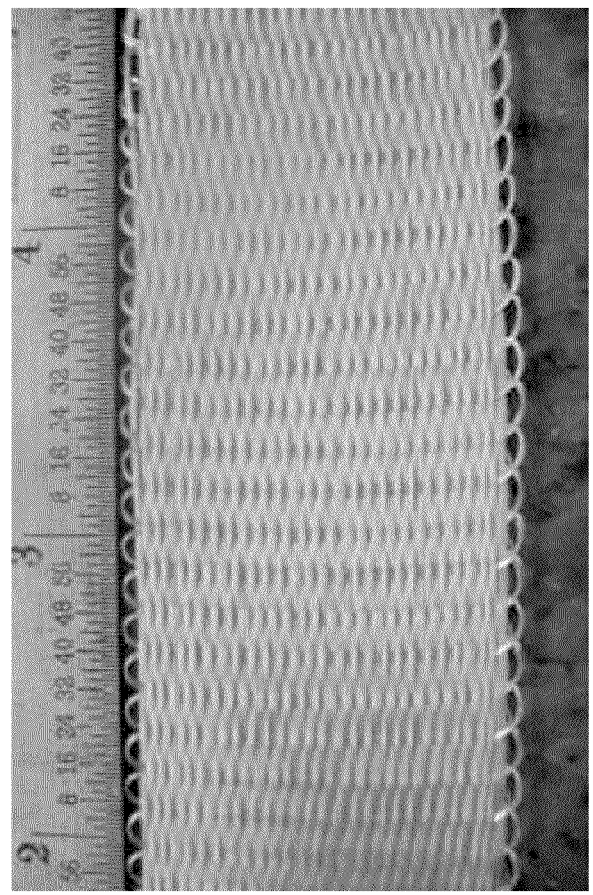
FIG. 3A is a photograph showing a top down view of a portion of a ceramic fiber (preform prior to being infiltrated with a pre-ceramic matrix slurry, as described in the EXAMPLE provided herein.
Figure 3B:
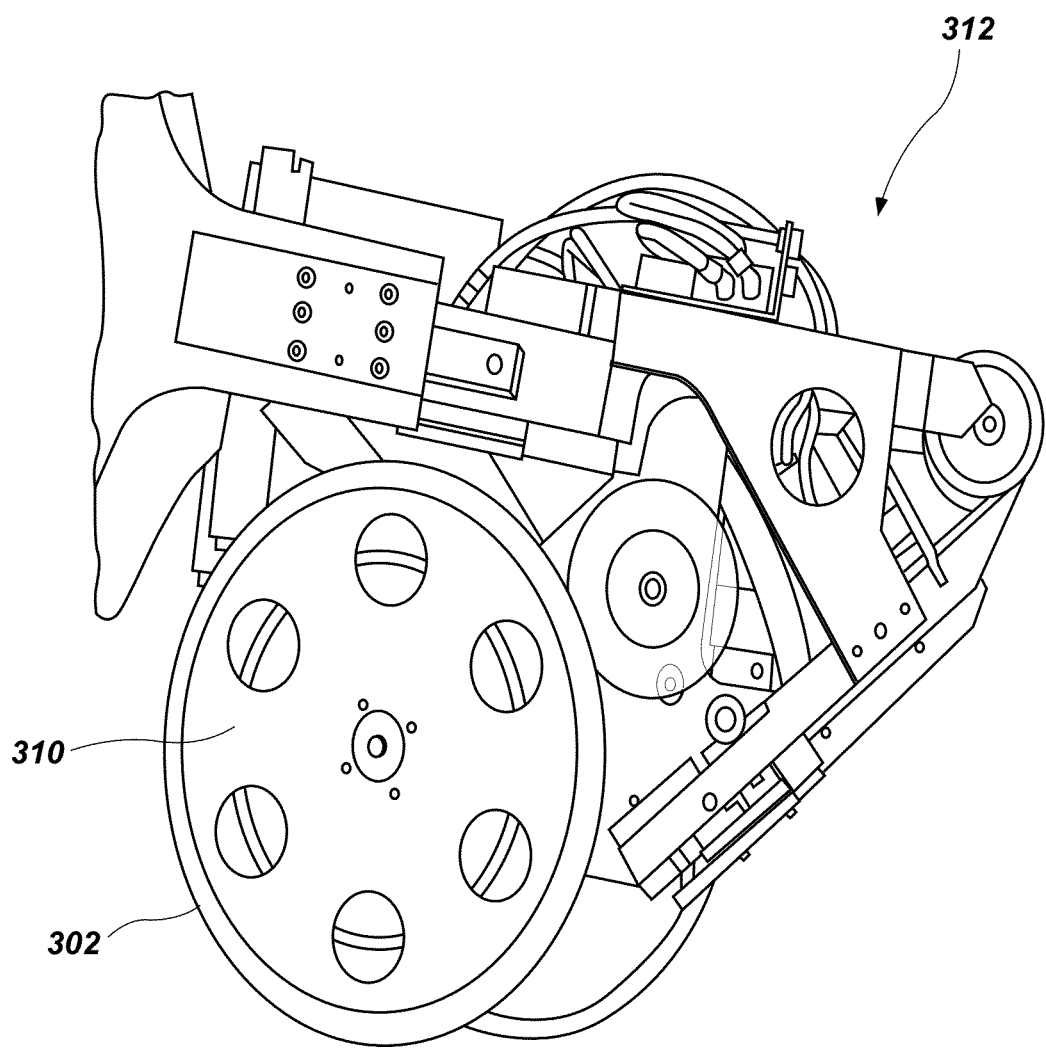
FIG. 3B is a side-elevation view illustrating a placement head of an AFP apparatus used to place a prepregged composite material on a surface of a tool, as described in the EXAMPLE provided herein.

One thousand (1000) linear feet of a one inch wide tape of 1500 denier NEXTEL® 610 tows stitched together with a glass fiber was then infiltrated with the pre-ceramic matrix slurry to form a prepregged composite material on an automated prepregging device. FIG. 3A is a photograph showing a top-down view of a portion of the tape of 1500 denier NEXTEL® 610 tows prior to being infiltrated with the pre-ceramic matrix slurry. The prepregged composite material was wound onto a reel and was provided to a conventional AFP apparatus configured to draw, place, and cut the prepregged composite material. FIG. 3B is a side-elevation view illustrating a placement head 312 of the AFP apparatus utilized, with the reel 310 of the prepregged composite material 302 provided thereon.

Figure 3D:
FIG. 3D is a photograph showing a perspective view of a cured composite material structure, as described in the EXAMPLE provided herein.
Figure 3C:
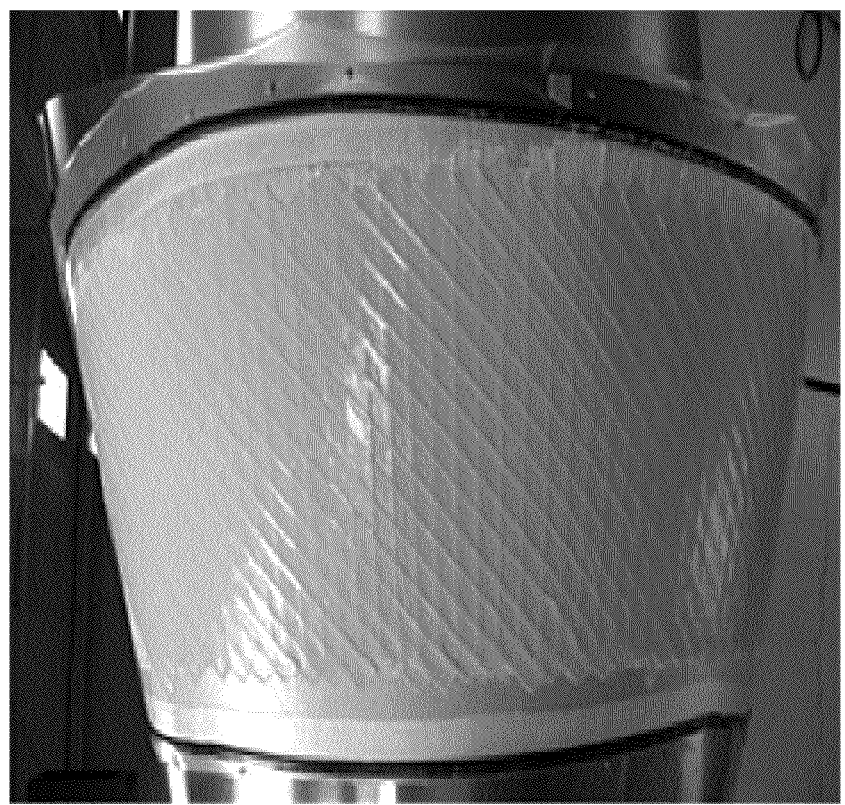
FIG. 3C is a photograph showing a side-elevation view of two layers of a prepregged composite material on a tool, as described in the EXAMPLE provided herein.

The AFP apparatus was used to firm eight layers of the prepregged composite material on a tool exhibiting the dimensions and shape of an aft cowl. FIG. 3C is a photograph showing a side-elevation view of the eight layers of the prepregged composite material on the tool. A first of the eight layers was placed on a contoured surface of the tool using the AFP apparatus, a second of the eight layers was placed on the first layer using the AFP apparatus, and subsequent layers were placed in a similar manner (e.g., a third layer was placed on the second layer using the AFP apparatus, a fourth layer was placed on the third layer using the AFP apparatus, etc.). The NEXTEL® 610 fibers of the second layer were oriented in a direction about +45 degrees offset from that of the NEXTEL® 610 fibers of the first layer. In turn, the NEXTEL® 610 fibers of the subsequent layers (i.e., the third layer through the eighth layer) were oriented in a direction about −45 degrees, about 90 degrees, about 90 degrees, about −45 degrees, about +45 degrees, and about 0 degrees offset from that of the NEXTEL® 610 fibers of the first layer, respectively.

Figure 3E:
FIG. 3E is a photograph showing a perspective view of a CMC structure, as described in the EXAMPLE provided herein.

Following placement on the tool, the eight layers of the pre-pregged composite material were vacuum bagged and then cured in an autoclave using a maximum applied temperature of about 125° C. and a maximum applied pressure of about 30 psi to form a cured composite material structure. FIG. 3D is a photograph showing a perspective view of the cured composite material structure. The cured composite material structure was then sintered using maximum applied temperature of about 1150° C., and subjected to conventional machining processes to form a CMC structure exhibiting the dimensions and shape of an aft cowl. FIG. 3E is a photograph showing a perspective view of the resulting CMC structure.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the present invention as defined by the following appended claims and their legal equivalents.

What is claimed is:

1. A method of forming a ceramic matrix composite structure, comprising:
  forming at least one prepregged composite material comprising a ceramic fiber preform and a pre-ceramic matrix slurry;
  placing the at least one prepregged composite material over at least one surface of a tool using an advanced fiber placement apparatus to form an at least partially uncured composite material structure; and
  exposing the at least partially uncured composite material structure at least to elevated temperatures to convert the at least partially uncured composite material structure into a ceramic matrix composite structure.

2. The method of claim 1, wherein placing the at least one prepregged composite material over at least one surface of a tool using an advanced fiber placement apparatus comprises placing the at least one prepregged composite over the at least one surface of the tool using an apparatus configured to draw, align, place, cut, and rethread the at least one prepregged composite material.

3. The method of claim 1, wherein placing the at least one prepregged composite material over at least one surface of a tool comprises placing the at least one prepregged composite material over a contoured surface of the tool using the advanced fiber placement apparatus.

4. The method of claim 1, wherein placing the at least one prepregged composite material over at least one surface of a tool comprises placing multiple prepregged composite materials over the at least one surface of the tool using the advanced fiber placement apparatus.

5. The method of claim 4, wherein placing multiple prepregged composite materials over the at least one surface of the tool using the advanced fiber placement apparatus comprises:
  placing a first layer of prepregged composite materials on the at least one surface of the tool using the advanced fiber placement apparatus; and
  placing a second layer of prepregged composite materials on the first layer of prepregged composite materials in a different orientation using the advanced fiber placement apparatus.

6. The method of claim 1, wherein forming at least one prepregged composite material comprises infiltrating at least one of a single tow of ceramic fibers, a tape of multiple tows of ceramic fibers, and a woven fabric of multiple tows of ceramic fibers with the pre-ceramic matrix slurry.

7. The method of claim 1, wherein forming the at least one prepregged composite material comprises formulating the pre-ceramic matrix slurry to impart the prepregged composite material with sufficient rigidity to be cut by the advanced fiber placement apparatus following placement of at least a portion of the at least one prepregged composite material over the at least one surface of the tool and with sufficient tackiness to adhere to the at least one surface of the tool.

8. The method of claim 1, wherein forming at least one prepregged composite material comprises infiltrating an oxide-based ceramic fiber preform with an oxide-based pre-ceramic matrix slurry, the oxide-based ceramic fiber preform comprising oxide ceramic fibers, and the oxide-based pre-ceramic matrix comprising an oxide ceramic sol and an oxide ceramic filler.

9. The method of claim 8, wherein the oxide ceramic fibers comprise at least one of alumina fibers, alumina-silica fibers, and alumina-boria-silica fibers.

10. The method of claim 8, wherein the oxide ceramic sol comprises a silica sol, and wherein the oxide ceramic filler comprises at least one of alumina, silica, and zirconia.

11. The method of claim 8, wherein the oxide-based pre-ceramic matrix further comprises a water-soluble organic material formulated to increase at least one of the rigidity, tackiness, and environmental resistance properties of the at least one prepregged composite material before and during placement over the at least one surface of the tool.

12. The method of claim 8, wherein exposing the at least partially uncured composite material structure at least to elevated temperatures to convert the at least partially uncured composite material structure into a ceramic matrix composite structure comprises:
  curing the at least partially uncured composite material structure to form a substantially cured composite material structure; and
  sintering the substantially cured composite material structure to form the ceramic matrix composite structure.

13. The method of claim 1, wherein forming at least one prepregged composite material comprises infiltrating a non-oxide-based ceramic fiber preform with a non-oxide-based pre-ceramic matrix slurry, the non-oxide-based ceramic fiber preform comprising non-oxide ceramic fibers, and the non-oxide-based pre-ceramic matrix slurry comprising a non-oxide pre-ceramic polymer and a non-oxide ceramic filler.

14. The method of claim 13, wherein the non-oxide ceramic fibers comprise at least one of silicon carbide fibers, silicon nitride fibers, fibers comprising silicon carbide on a carbon core, silicon carbide fibers containing titanium, silicon oxycarbide fibers, silicon oxycarbonitride fibers, and carbon fibers.

15. The method of claim 13, wherein the non-oxide pre-ceramic polymer comprises at least one of a polysiloxane, a polysilazane, a polysilane, a polycarbosilane, a polycarbosilazane, and a polysilsesequioxane, and wherein the oxide ceramic filler comprises at least one of silicon carbide, silicon nitride, silicon hexaboride, boron nitride, boron carbide, titanium boride, titanium carbide, hafnium carbide, and aluminum nitride.

16. The method of claim 13, wherein the non-oxide pre-ceramic polymer is formulated to increase at least one of the rigidity, tackiness, and environmental resistance properties of the at least one prepregged composite material before and during placement over the at least one surface of the tool.

17. The method of claim 13, wherein exposing the at least partially uncured composite material structure at least to elevated temperatures to convert the at least partially uncured composite material structure into a ceramic matrix composite structure comprises:
  curing the at least partially uncured composite material structure to form a substantially cured composite material structure; and
  pyrolyzing the substantially cured composite material structure to convert the non-oxide pre-ceramic polymer to a non-oxide ceramic material and form the ceramic matrix composite structure.

18. The method of claim 1, wherein placing the at least one prepregged composite material over at least one surface of a tool using an advanced fiber placement apparatus comprises increasing the rigidity of the at least one prepregged composite material with the advanced fiber placement apparatus prior to placing the at least one prepregged composite material over the at least one surface of the tool.

19. The method of claim 1, wherein increasing the rigidity of the at least one prepregged composite material with the advanced fiber placement apparatus comprises cooling the at least one prepregged composite material to a temperature within a range of from about −25° C. to about 35° C. with the advanced fiber placement apparatus prior to placing the at least one prepregged composite material over the at least one surface of the tool.

20. A method of forming a ceramic matrix composite structure, comprising:
  infiltrating ceramic fiber preforms with at least one of an oxide-based pre-ceramic matrix slurry and a non-oxide-based pre-ceramic matrix slurry to form prepregged composite materials;
  placing the prepregged composite materials in continuous, edge to edge, contact over a surface of a tool using an advanced fiber placement apparatus to form at least one layer of the prepregged composite materials;

subjecting the at least one layer of the prepregged composite materials to a curing process to form a substantially cured composite material structure; and subjecting the substantially cured composite material structure to a densification process.

21. The method of claim 20, wherein the infiltrating ceramic fiber preforms with at least one of an oxide-based pre-ceramic matrix slurry and a non-oxide-based pre-ceramic matrix slurry comprises infiltrating the ceramic fiber preforms with the oxide-based pre-ceramic matrix slurry, the oxide-based pre-ceramic matrix slurry comprising from about 20 percent by weight to about 60 percent by weight oxide pre-ceramic polymer and the from about 20 percent by weight to about 80 percent by weight oxide ceramic filler.

22. The method of claim 20, wherein the infiltrating ceramic fiber preforms with at least one of an oxide-based pre-ceramic matrix slurry and a non-oxide-based pre-ceramic matrix slurry comprises infiltrating the ceramic fiber preforms with the non-oxide-based pre-ceramic matrix slurry, the non-oxide-based pre-ceramic matrix slurry comprising from about 20 percent by weight to about 60 percent by weight non-oxide pre-ceramic polymer and the from about 20 percent by weight to about 60 percent by weight non-oxide ceramic filler.

23. The method of claim 20, wherein placing the prepregged composite materials in continuous, edge to edge, contact over a surface of a tool using an advanced fiber placement apparatus to form at least one layer of the prepregged composite materials comprises forming multiple layers of the prepregged composite materials over the surface of the tool, the prepregged composite materials of at least one of the multiple layers oriented a direction about 45 degrees offset from a direction of the prepregged composite materials of at least one other of the multiple layers.

24. The method of claim 20, wherein placing the prepregged composite materials in continuous, edge to edge, contact over a surface of a tool using an advanced fiber placement apparatus comprises increasing at least one of the tackiness and the rigidity of the prepregged composite materials with the advanced fiber placement apparatus prior to and during placement of the prepregged composite materials over the surface of the tool.

25. A method of forming a ceramic matrix composite structure, comprising:

forming at least one prepregged composite material comprising at least one tow of ceramic fibers impregnated with a pre-ceramic matrix slurry;

placing the at least one prepregged composite material over at least one surface of a tool having an irregular three-dimensional shape using an advanced fiber placement apparatus to form an at least partially uncured composite material structure;

curing the at least partially uncured composite material structure to form a cured composite material structure; and exposing the cured composite material structure to a sintering process or a pyrolysis process.

26. The method of claim 25, wherein forming the at least one prepregged composite material comprises forming the at least one prepregged composite material to comprise at least one of a tape of multiple tows of the ceramic fibers, and a woven fabric of multiple tows of the ceramic fibers.

27. The method of claim 25, wherein placing the at least one prepregged composite material over at least one surface of a tool having an irregular three-dimensional shape using an advanced fiber placement apparatus comprises:

selecting the tool to exhibit an exhaust duct shape, a nozzle shape, a fan cowl shape, a thrust reverser shape, an auxiliary power unit shape, a fuselage shape, a tapered wing skin shape, or a nose cone shape;

cooling the at least one prepregged composite material using the advanced fiber placement apparatus to increase the rigidity of the prepregged composite material; and adhering the at least one cooled prepregged composite material to multiple surfaces of the tool using the advanced fiber placement apparatus.

28. A method of forming a ceramic matrix composite structure, comprising:

forming prepregged composite materials each independently comprising a ceramic fiber preform and a pre-ceramic matrix slurry over and around ceramic fibers of the ceramic fiber preform;

forming layers of the prepregged composite materials over at least one contoured surface of a tool using an advanced fiber placement apparatus, at least one of the layers of the prepregged composite materials oriented in a direction about 45 degrees offset from a direction of another of the layers of the prepregged composite materials and about 90 degrees offset from a direction of yet another of the layers of the prepregged composite materials; and exposing the layers of the prepregged composite materials at least to elevated temperatures to cure and densify the layers of the prepregged composite materials.

* * * * *

UNITED STATES PATENT AND TRADEMARK OFFICE
CERTIFICATE OF CORRECTION

PATENT NO. : 9,102,571 B2
APPLICATION NO. : 13/741052
DATED : August 11, 2015
INVENTOR(S) : Andrew Szweda and Thomas Barrett Jackson Page 1 of 1

It is certified that error appears in the above-identified patent and that said Letters Patent is hereby corrected as shown below:

In the specification:

| | | |
|---|---|---|
| COLUMN 9, | LINE 43, | change "5290.389," to --5,290,389,-- |
| COLUMN 12, | LINE 38, | change "using maximum" to --using a maximum-- |

In the claims:

| | | | |
|---|---|---|---|
| CLAIM 21, | COLUMN 15, | LINE 13, | change "and the from" to --and from-- |
| CLAIM 22, | COLUMN 15, | LINE 22, | change "and the from" to --and from-- |

Signed and Sealed this
Twenty-ninth Day of December, 2015

Michelle K. Lee
*Director of the United States Patent and Trademark Office*